INVENTOR.
HARALD HALVARSSON

Sept. 1, 1959     H. HALVARSSON     2,901,831
GEAR TOOTH MEASURING INSTRUMENT

Filed May 13, 1957     2 Sheets-Sheet 2

INVENTOR.
HARALD HALVARSSON
BY
ATTORNEYS

United States Patent Office 2,901,831
Patented Sept. 1, 1959

2,901,831

GEAR TOOTH MEASURING INSTRUMENT

Harald Halvarsson, Ektorp, Nacka, Sweden, assignor to De Laval Steam Turbine Company, Trenton, N.J., a company of New Jersey Application May 13, 1957, Serial No. 658,551

6 Claims. (Cl. 33—179.5)

This invention relates to a gear tooth measuring instrument and, more particularly, to an instrument for accurately measuring undulations in the helicoid flank of a tooth of a helical gear.

Helical gears and particularly those transmitting high loads at high speeds must have their teeth accurately formed in order to insure reasonably uniform load distribution over the teeth during operation. There is presently employed, as a common method for indicating undulations along the helicoid flank of a gear tooth, an indicator running on steel balls which are placed in the tooth space adjacent to the helix to be measured. In this method, undulations of the helix in which the balls run can be either in or out of phase with the helicoid flank being measured. The results are, therefore, unreliable.

It is the primary object of this invention to provide a relatively simple apparatus for measuring the degree of undulations in the helicoid flank of a gear tooth with a high degree of accuracy.

It is a further object of the invention to provide apparatus which can be employed on various gears having various gear diameters and various helix angles.

Figure 1:
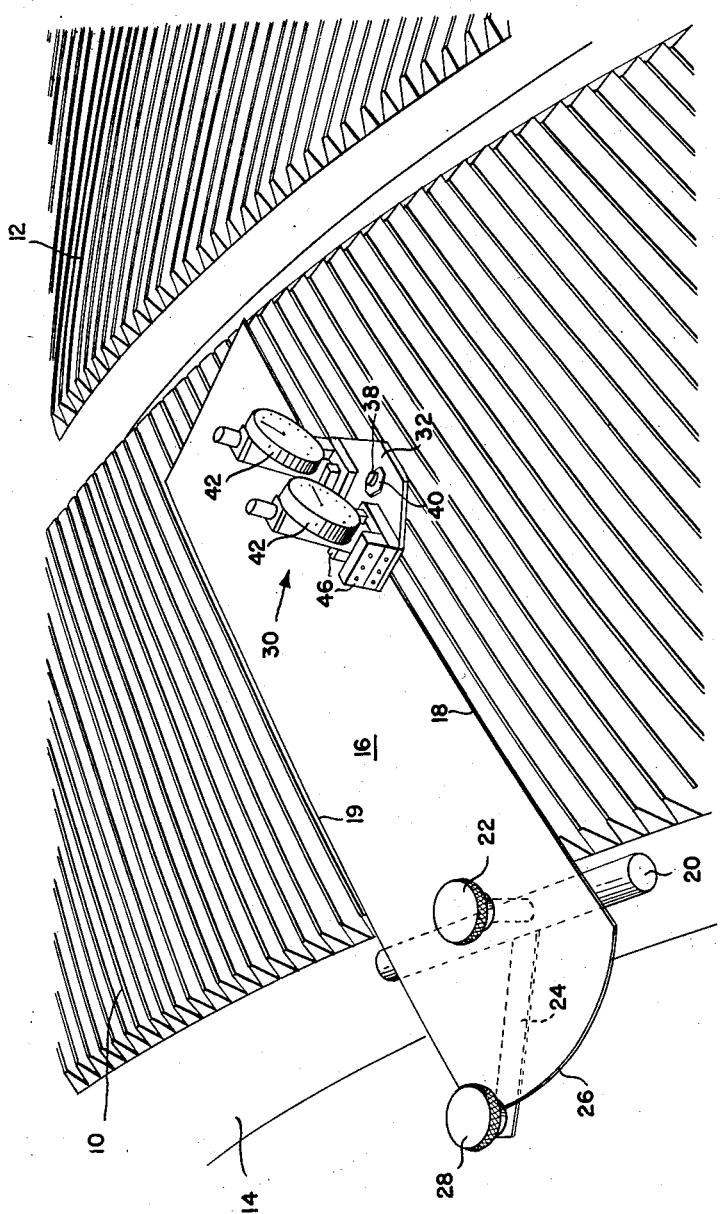
Figure 2:
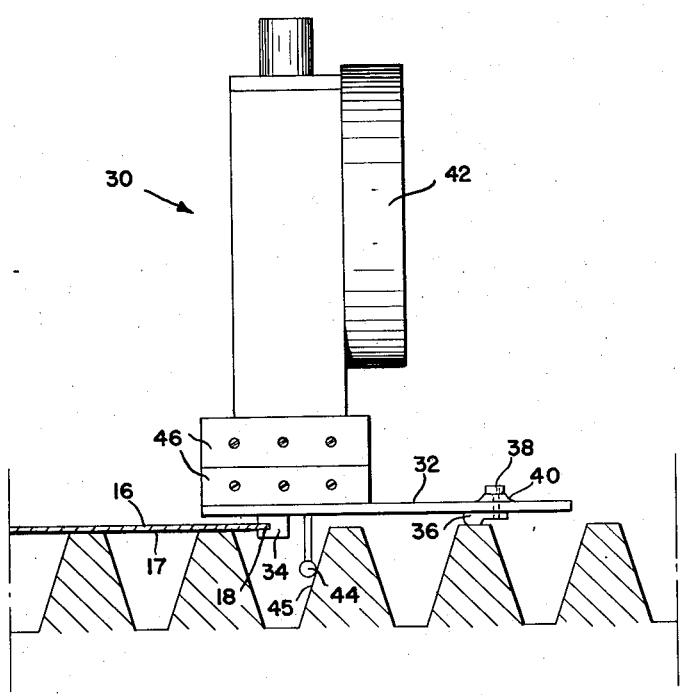

These and other objects of the invention relating particularly to the construction thereof and to the method of use thereof will become evident from the following description when read in conjunction with the accompanying drawings in which:

Figure 1 is a perspective showing of a fragmentary portion of a helical gear having the measuring instrument positioned thereon; and Figure 2 is a fragmentary section through a gear and through a portion of the measuring instrument positioned thereon.

Figure 1 shows a double helical gear having arrays of teeth 10 and 12 formed in the surface of a cylindrical member 14. A thin flexible strip 16 is positioned in engagement with the tops or crowns of the underlying gear teeth with its longitudinal axes extending parallel to the direction of the gear teeth. The strip may be formed of a plastic material or of metal and may be, for example, a steey sheet of a thickness of approximately 0.004″–0.01,″ the smaller the thickness the smaller the diameter of the gear.

The strip 16 is formed with a straight edge 18 which is positioned substantially parallel to an adjacent tooth and which is bent upon placement of the strip 16 against the gear teeth to form an elliptic curve. The strip is of sufficient width that no deformation can take place transversely of the strip. The length of the strip is desirably in excess of the length of the gear teeth and the width of the strip should be sufficient to permit positioning the strip in engagement with at least several adjacent gear teeth. While, hereafter, reference will be made only to the straight edge 18, it will be evident that the opposite edge 19 may also be a straight edge and may be used interchangeably with the edge 18, if desired.

In order to assist in positioning the strip on the surface of the gear, the strip is provided at its outer end with a guide bar 20 which is pivotally connected to the strip 16 and spaced therefrom by means of a stud having a head 22 extending above the strip 16. The guide bar 20 is adapted to bear against the plane side 14 of the gear. In order to provide for angular adjustment of the guide bar 20, there is provided a member 24 affixed to the guide bar 20 adjacent to the pivotal axes thereof and extending outwardly to the left hand end 26 of the strip 16 as viewed in Figure 1. The end 26 of the strip 16 is contoured to form the circumference of an arc having a radius point coincident with the center of rotation of the guide bar 20, and the outer end of the member 24 mounts a locking screw 28 by which the member 24 is locked into a fixed position thus locking the guide bar 20 in a fixed position. By preadjustment of the member 24 and the guide bar 20, placement of the straight edge 18 parallel to the flank of a gear tooth may be facilitated. As will hereinafter become evident, an exact degree of parallelism is not essential. It is only necessary that the linear edge 18 of the strip 16 be placed in a position reasonably parallel to the flank of a gear tooth to be measured.

An indicator assembly indicated generally at 30 in Figures 1 and 2 includes a base plate 32 below which are affixed two spaced channel forming members 34, only one of which is shown in Figure 2, the other being behind the one shown in Figure 2. The two members 34 are spaced in order to permit the indicating means to be moved along the straight edge 18 of the strip regardless of the degree of flexure of the strip. Also positioned below the plate 32 is a swivel foot support 36 which is pivotally mounted below the plate by means of a bolt 38 extending through the plate and having its head positioned above the plate and spaced therefrom by means of a spring member 40 serving to retain the bolt and the swivel foot in preset position. As will become evident upon viewing Figure 2, the plate 32 is urged to the left with the members 34 in engagement with the straight edge 18 of the strip 16 and the swivel foot 36 is rotated so as to fall into position upon the top of a gear tooth.

Dial indicators 42 are mounted on the top of the plate 32 and each of the dial indicators is provided with a sensing element such as that shown at 44 in Figure 2 extending through and below the plate for engagement with a helicoid flank 45 of a gear tooth to be measured. The dial indicators are entirely conventional and need not be described in detail herein, it being sufficient to note that the arrangement is such that minute deviations in the position of the sensing element 44 are indicated by the dial indicators. Apparatus of this type may be employed to provide extremely accurate indications as is well known in the art and, in the present instance, the accuracy of the indicators is of the order of 1 micron. In order to provide for the engagement of dial indicator sensing elements 44 with a gear tooth along the desired depth thereof and with the dial indicator reading at desired predetermined dial location, the dial indicators are mounted on the plate 32 by means of block assemblies 46 in such manner as to provide substantially universal movement of the dial indicator assembly and for the locking of the dial indicator assembly in a suitable position to accomplish the foregoing.

When the strip has been positioned with its straight edge extending for the length of the gear teeth and substantially parallel to the flank of a tooth to be measured and overlapping the top of a tooth as shown in Figure 2, the indicator assembly is positioned with the members 34 in engagement with the straight edge 18 and the foot 36 is adjusted to rest upon the top of a gear tooth. The dial indicator assemblies are adjusted to bring the two dials to a desired zero setting with the sensing element 44 positioned at a desired height along the flank of the gear tooth to be measured. After these preliminary settings have been accomplished the indicator assembly is moved along the length of a tooth while the members 34 are held into engagement with the straight edge 18 and the foot 36 is maintained at rest upon the top of its associated gear tooth. During movement of the indicator assembly the dial indicators are read at successive positions of the indicator assembly and a plot is made of these readings against the length of a gear tooth. It will be evident that if the straight edge 18 is not exactly parallel with the gear tooth being measured there will occur a gradual deviation in the indicator readings between one end and the other end of the gear tooth. This deviation is, however, of no consequence. What is of consequence is any local deviation of excessive magnitude which will locate irregularities or undulations in the helicoid gear tooth face.

As previously noted, the three point contact of the indicator assembly and the flexible strip permits employment of the measuring instrument for the measurement of gear tooth undulation on gears having various diameters and helix angles. The two dial indicators are necessarily provided in order to secure readings out to the extreme ends of a gear tooth. This arrangement permits the positioning of a sensing member 44 substantially adjacent to or even slightly outboard of each of the guide members 34.

Various means may be employed to secure the strip 16 in position against the tops of the gear teeth during manipulation of the instrument, these may include clamps, magnets, and sand bags or other weights. A preferable arrangement, however, is to apply to the underside of the strip 16 an adhesive layer 17 or a removable double coated adhesive stripping such as, for example, a thin plastic sheet having an adhesive coating on each face thereof. When an adhesive coating is provided on the underside of the strip 16 which, as previously noted is a light flexible strip, and the strip is placed against the flat tops of the gear teeth, adhesion of the adhesive coating to the gear teeth will serve to retain the strip 16 sufficiently immobile on the surface of the gear to permit manipulation of the indicator assembly.

As previously noted, the pattern of undulation may be plotted on a graph against the length of a gear tooth and, in this plot, a pattern of deviations or undulation along the helicoid may be found to occur in a repeating cycle, such patterns are of particular interest in studying the behavior of a gear hobber and the measuring instrument provides an extremely simple and accurate means of obtaining this information.

While the indicators described in connection with the embodiment of the invention shown in the figures are conventional dial gauge indicators, it will be evident that various other measuring devices may be employed such as, for example, optical instruments, air, electrical or other mechanically operated gauges.

What I claim is:

1. A gear tooth undulation measuring instrument comprising a substantially wide relatively thin strip having at least one longitudinally extending straight narrow side edge, said strip being flexible for conforming to the cylindrical face surface of a gear and being adapted for overlying adjacent gear teeth in contact with the crowns thereof and for being positioned with said straight edge parallel to the flank of a gear tooth to be measured, and gauging means including channel means slidably embracing said straight edge and movable longitudinally along said straight edge in engagement therewith, and means mounted for movement with said channel means and responsive to undulations in the flank of a tooth being measured thereby for indicating the location and degree of said undulations as the gauging means is moved along said straight edge.

2. An instrument in accordance with claim 1 including means for securing said strip in engagement with said crowns of the gear teeth.

3. An instrument in accordance with claim 1 including means providing an adhesive layer over said strip for securing said strip to said crowns of the gear teeth.

4. An instrument in accordance with claim 1 including means cooperating with a side face of the gear for positioning said straight edge substantially parallel to a gear tooth.

5. A gear tooth undulation measuring instrument comprising a substantially wide relatively thin strip having at least one longitudinally extending straight narrow side edge, said strip being flexible for comforming to the cylindrical face surface of a gear and being adapted for overlying adjacent gear teeth in contact with the crowns thereof and for being positioned with said straight edge parallel to the flank of a gear tooth to be measured, and gauging means including channel means slidably embracing said straight edge and movable longitudinally along said straight edge in engagement therewith, means mounted for movement with said channel means in contact with a tooth to be measured, and means responsive to the position of said contact means for indicating the location and degree of said undulations.

6. A gear tooth undulation measuring instrument comprising a substantially wide relatively thin strip having at least one longitudinally extending straight narrow side edge, said strip being flexible for conforming to the cylindrical face surface of a gear and being adapted for overlying adjacent gear teeth in contact with the crowns thereof and for being positioned with said straight edge parallel to the flank of a gear tooth to be measured, and gauging means including two spaced channel members slidably embracing said straight edge and movable longitudinally along said straight edge in engagement therewith, means adapted to rest upon an adjacent gear tooth to support said gauging means, and means mounted for movement with said channel members and gauge supporting means and responsive to undulations in the flank of a tooth being measured thereby for indicating the location and degree of said undulations as the gauging means is moved along said straight edge and over said adjacent gear tooth.

References Cited in the file of this patent
UNITED STATES PATENTS

| | | |
|---|---|---|
| 465,264 | Hare | Dec. 15, 1891 |
| 1,073,089 | Bowers | Sept. 16, 1913 |
| 2,087,970 | Hannah | July 27, 1937 |
| 2,155,705 | Gottwald | Apr. 25, 1939 |
| 2,190,582 | Wolf | Feb. 13, 1940 |
| 2,360,754 | Beckett | Oct. 17, 1944 |
| 2,420,608 | Menge | May 13, 1947 |
| 2,512,285 | Nippert | June 20, 1950 |
| 2,568,817 | Moss | Sept. 25, 1951 |
| 2,758,375 | Badovinac | Aug. 14, 1956 |